Nov. 19, 1968     H. HORNER     3,411,244
BEADING
Filed May 25, 1966

INVENTOR.
HAROLD HORNER
BY Cumpston + Shaw
ATTORNEYS 3,411,244
BEADING
Harold Horner, Seacroft, Leeds, England, assignor to The Schlegel Manufacturing Company, Rochester, N.Y., a corporation of New York
Filed May 25, 1966, Ser. No. 552,740
Claims priority, application Great Britain, May 27, 1965, 22,563/65
3 Claims. (Cl. 49—491)

ABSTRACT OF THE DISCLOSURE

An edge beading for a structural member is formed with a woven wire framework having legs straddling the edge with the wires bent to form inturned knees and with a resilient cover extending over the ends of the legs and in past the knees so that the knees press the cover against the surface over which the beading is forced to retain both the cover and the beading in place.

---

This invention relates to a molding or beading for protecting raw edges of structural members. The inventive beading is intended for use around door frames, windows, and the like, and is especially, but not exclusively, intended for covering and protecting structural edges of metal, fiberglass, or the like, in the interior of automobile or aircraft bodies. In addition to trimming and protecting such edges, the inventive beading can be adapted to act as a weatherstrip around door, window, or other openings in such bodies.

The objects of the invention include, but are not limited to, the following:

(a) a beading that is simple and economical to manufacture and install;
(b) a beading that stays in place securely over the edge on which it is installed;
(c) a beading that is flexible, reliable, durable, and long-lived;
(d) a bearing that retains its cover securely on its supporting frame;
(e) a beading adapted to serve as a weatherstrip in addition to trimming the edge on which it is secured;
(f) a beading that is water-tight relative to the edge on which it is secured; and
(g) a single sized beading capable of fitting securely over a variety of thicknesses of structural edges without adjustment.

These and other objects of the invention will be apparent hereinafter from the specification which describes the invention, its use, and preferred embodiments, from the drawings which constitute a part of the disclosure, and from the subject matter claimed.

Generally, the inventive beading comprises a resilient frame for straddling the structural edge on which the beading is secured, and a resilient cover overlying the frame. At least one of the straddling sides of the frame is formed with an inturned ridge pressing toward a surface of the structural member adjacent the edge over which the beading is secured, and the marginal edges of the cover extend inward beyond this ridge and are pressed against the structural surfaces by the resilient sides of the frame. Preferably each side of the frame is formed with an inturned ridge for pressing each marginal edge of the cover against side surfaces of the structural member, and preferably the edges of the cover are thickened to form bulbous sections disposed inwardly of the inturned ridges. Preferably, the pressing of the cover against the side surfaces of the structural edge by the resilient frame provides not only the sole means for anchoring the beading in operative position, but also the sole means for retaining the cover securely on the frame.

Generally, the inventive beading for trimming a structural member includes: a resilient supporting frame having a pair of legs for straddling the edge of the structural member, the legs being turned in and out relative to the surfaces of the structural member to form inturned knee-ridges extending longitudinally of the beading; a resilient cover overlying the frame and extending over the ends of the legs and inward between the legs; and the marginal edges of the cover being thickened and trapped behind the knee-ridges which press the cover against the surfaces of the structural member to hold the beading in place and secure the cover on the frame.

In the drawings.

Throughout the drawings, corresponding parts are identified by the same reference numerals.

Figure 1:
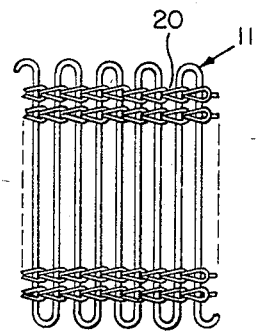
FIG. 1 is a plan view of a preferred form of frame for the inventive beading.

Although several forms of resilient carrier frames are possible within the spirit of the invention, the preferred form of resilient frame 11 is best shown in. FIG. 1. Frame 11 is formed of resilient wire looped back and forth transversely of beading 10 in a zigzag fashion, and the loops thus formed are preferably held together with stitching 20. Frame 11 is thus flexible, and can be led around corners, through a twisting path, etc., so that the beading 10 can be secured to structural edges having a variety of shapes.

Figure 2:
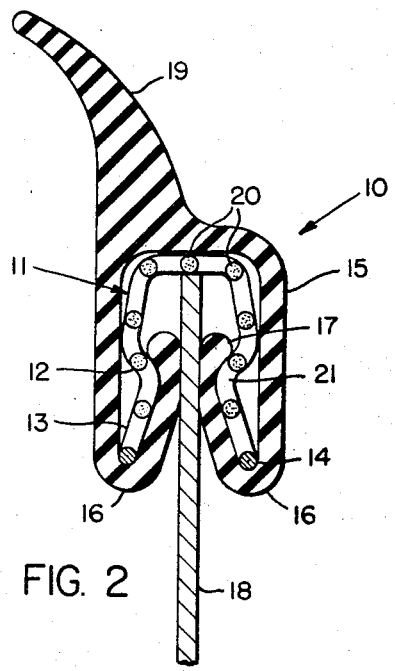
FIG. 2 is a section view of a preferred form of the inventive beading secured to a structural edge.

Carrier frame 11 is formed into a generally U-shaped channel preferably having the shape best illustrated in section in FIG. 2. The opposed legs of frame 11 straddle the edge of structural member 18 and extend over the side surfaces of member 18 adjacent its edge. The resilient legs of frame 11 preferably press inward toward engagement wtih the surfaces of member 18.

As best shown in FIG. 2, at least one leg and preferably both legs of frame 11 have a reach 12 that is turned obliquely inward toward a surface of member 18, and a reach 13 turned obliquely outward away from the surface of member 18 so that frame 11 terminates in open distal ends or edges 14. An inturned knee or ridge 21 is thus formed extending longitudinally of beading 10. Ridge 21 concentrates the inward pressure of the resilient legs of frame 11.

Cover 15 for frame 11 is preferably formed of resilient material such as natural or synthetic rubber or plastic material, and is arranged to overlie the outside of frame 11. Preferably, cover 15 is extruded or formed with folds 16 doubling back opposed marginal edges that preferably terminate in thickened portions forming bulbous sections 17. In disposing cover 15 over frame 11, folds 16 are positioned at the edges 14 of frame 11 and bulbous edges 17 extending into the channel of frame 11 beyond inturned ridges 21 as best shown in FIG. 2. Cover 15 thus encloses and provides a housing for frame 11.

As best shown in FIG. 2, the inturned ridges 21 press against cover 15 adjacent its bulbous edges 17 to urge cover 15 into engagement with the side surfaces of structural member 18. This holds beading 10 securely in operative position on member 18, and at the same time, retains cover 15 securely in its position overlying frame 11. The result is not only a secure engagement of the beading 10 with member 18, but a secure holding of cover 15 in place, eliminating any need for cementing or fusing cover 15 to frame 11. Such an arrangement also forms a water-tight seal between beading 10 and member 18 and keeps water from entering the inside channel portion of the beading 10. In addition, beading 10 is flexible and accommodates small relative movement between cover 15 and frame 11 to permit twisting and bending of the beading around corners more easily than prior art beadings. Also, the described arrangement for securing beading 10 in place is automatically adjustable for different thicknesses of structural members 18, and a single-sized beading can be pressed into secure engagement with a variety of thicknesses of members 18.

Cover 15 could also be extruded or formed in a generally flat condition and later formed into the configuration shown in FIG. 2. Also, the marginal edges of cover 15 can be cemented or fused to the marginal edges of carrier 11, but such a step is preferably eliminated by forming cover 15 with bulbous edges 17 disposed inwardly of inturned ridges 21 in the illustrated relation.

Figure 3:
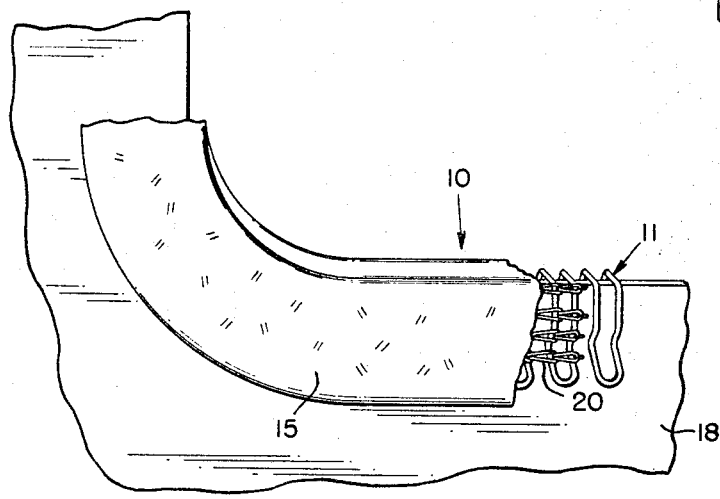
FIG. 3 shows a partially cut away perspective view of a preferred form of the inventive beading secured to a structural edge.

The cover 15 shown in FIG. 2 is formed with an integral, upwardly and outwardly directed fin-like extension 19 adapting beading 10 for functioning as a weatherstrip. Extension 19 can be formed in a variety of different shapes depending on its specific weatherstripping purpose, and as shown in FIG. 3, extension 19 is omitted when the inventive beading is used primarily as a trimming strip.

It will thus be seen that the invention accomplishes its above stated objects. Other features, advantages, and other specific embodiments of this invention will be apparent to those exercising ordinary skill in the pertinent art after considering the foregoing disclosure. In this regard, while specific preferred embodiments have been described in considerable detail, such disclosure is intended as illustrative, rather than limiting, and other embodiments, variations, and modifications can be effected within the spirit and scope of the invention as disclosed and claimed.

I claim:
1. A beading for trimming an edge of a structural member, said beading comprising:
(a) a supporting frame of resilient material;
(b) said frame in section defining a pair of legs for straddling said edge and extending over opposite surfaces of said structural member adjacent said edge;
(c) each of said legs, from the proximal end toward the distal end, being first turned obliquely inward toward respective surfaces of said structural member and then turned obliquely outward away from said respective surfaces of said structural member to form inturned knee-ridges extending longitudinally of said beading;
(d) a cover of resilient material laid freely over the outside of said frame and extending over the distal ends of said legs and inward between said legs; and
(e) the marginal edges of said cover being thicckened to form enlarged sections disposed on the proximal side of said inturned knee-ridges so that knee-ridges press said cover against said respective surfaces of said structural member to trap said enlarged sections behind said knee-ridges to anchor said beading in operative position and provide the sole means for securing said cover on said frame.

2. The beading of claim 1 wherein said support frame is formed of wire looped back and forth transversely of said beading.

3. The beading of claim 2 wherein said loops of said frame are secured together with stitching.

References Cited

UNITED STATES PATENTS

| | | | |
|---|---|---|---|
| 2,685,473 | 8/1954 | Adell | 49—462 |
| 2,686,691 | 8/1954 | Burrell | 49—490 X |
| 2,746,103 | 5/1956 | Bright | 49—491 |
| 2,856,230 | 10/1958 | Adell | 49—491 X |
| 3,091,821 | 6/1963 | Cook | 49—491 X |
| 3,124,851 | 3/1964 | Straight et al. | 49—491 |
| 3,197,821 | 8/1965 | Bright | 49—491 |
| 3,238,583 | 3/1966 | Bright | 49—491 X |
| 3,239,987 | 3/1966 | Lansing | 49—490 X |

DAVID J. WILLIAMOWSKY, *Primary Examiner.*

P. C. KANNAN, *Assistant Examiner.*